Patented Jan. 30, 1934

1,945,484

UNITED STATES PATENT OFFICE 1,945,484

DYESTUFF PREPARATIONS

Alfred Hagenböcker and Rudolf Brune, Frankfort-on-the-Main-Hoechst, Germany, assignors to General Aniline Works, Inc., New York, N. Y., a corporation of Delaware No Drawing. Application September 10, 1930, Serial No. 481,072, and in Germany July 16, 1928

11 Claims. (Cl. 8—6)

The present invention relates to new dyestuff preparations.

We have found that in the process of printing with thioindigoid dyestuffs, a more intense color and a considerable acceleration of the fixation can be attained by printing with such dyestuff preparations to which a salt, an oxide, or a hydroxide of a heavy metal has been added in a quantity of less than one mol calculated upon the dry pure dyestuff. As additional substances there may be used, for instance, salts of iron, such as ferrous sulfate, ferric sulfate, copper salts, tin salts, zinc salts or the oxides or hydroxides of the said metals. The state of oxidation of the metals used does not have any influence upon the result to be attained. The quantity of the said heavy metal compounds, which is to be added, may vary. It suitably amounts to $1/20$–$1/2$ mol calculated upon the dry pure dyestuff, but also smaller or greater quantities may be used. The heavy metal compounds in question may either be added directly to the dyestuff paste and a printing paste may be prepared therefrom in the usual manner, i. e. by addition of a thickening agent, a reducing agent, an agent of alkaline action and the other usual admixtures, or a printing paste may be prepared in the usual manner from the dyestuff and the above mentioned agents and to this paste there may be added such a quantity of the heavy metal compound as is necessary, either before or after the reduction. As reducing agents there may be used in the said printing pastes, for instance, sodium hydrosulfite or potassium hydrosulfite, sodium sulfoxylate formaldehyde or the like. As agents of alkaline action there may advantageously be used for preparing the printing paste sodium carbonate, potassium carbonate or caustic alkalies.

The following examples serve to illustrate the invention, but they are not intended to limit it thereto:

(1) 150 grams of 4.4'-dimethyl-6.6'-dichlorthioindigo in a 12% paste (molecular weight 393) are thoroughly mixed with 3.2 grams of iron vitriol (molecular weight 278) (corresponding with $1/4$ mol calculated upon 1 mol of the dyestuff). There are added:

80 grams of glycerin
350 grams of wheat starch tragacanth thickening
120 grams of potassium carbonate
150 grams of sodium sulfoxylate formaldehyde 1:1 made up with water to 1 kilo The material is printed with this paste, steamed for 3 minutes in a rapid ager (Mather-Platt apparatus) oxidized while rinsing with water and finished. There are thus obtained intense pink printings which, in comparison with those prepared without addition of iron vitriol, are distinguished by their intense and vivid hue.

(2) 150 grams of 4-methyl-6-chloro-6'-methoxy-thioindigo in a 17% paste (molecular weight 374.5) are well mixed with 6.3 grams of iron vitriol (corresponding with $1/3$ mol calculated upon 1 mol of the dyestuff).

There are added:

80 grams of glycerin
350 grams of wheat starch tragacanth thickening
120 grams of potassium carbonate
150 grams of sodium sulfoxylate formaldehyde 1:1 made up with water to 1 kilo The material is printed with this paste and treated as in Example 1. There are obtained intense red printings which in comparison with those prepared without addition of iron vitriol are distinguished by their intense and vivid hue.

(3) A printing paste is prepared from:

150 grams of 4.4'-dimethyl-6.5'.7'-trichlorothioindigo in a 10% paste (molecular weight 427,5)
80 grams of glycerin,
350 grams of wheat starch tragacanth thickening,
120 grams of potassium carbonate
150 grams of sodium sulfoxylate formaldehyde 1:1
2,8 grams of ferric chloride (molecular weight 162) (corresponding with $1/2$ mol calculated upon 1 mol of the dyestuff) made up with water to 1 kilo The material is printed with this paste, dried and steamed for 3 minutes in a Mather-Platt apparatus. It is then oxidized and further treated in known manner. There is obtained an intense bluish pink printing which, in comparison with that obtained without addition of ferric chloride is distinguished by a vivid and deep tint.

(4) A printing paste is prepared from:

150 grams of 6.6'-diethoxythioindigo in a 10% paste (molecular weight 384)
80 grams of glycerin
350 grams of wheat starch tragacanth thickening
120 grams of potassium carbonate
150 grams of sodium sulfoxylate formaldehyde 1:1
1,9 grams of freshly precipitated copper sulfide (molecular weight 95,6) (corresponding with ½ mol calculated upon 1 mol of the dyestuff) made up with water to 1 kilo The material is printed with this paste, dried and steamed for 3 minutes in a Mather-Platt apparatus. It is then oxidized and further treated in known manner. There are obtained vivid orange tints which, in comparison with those prepared without addition of copper sulfide, are distinguished by their vivid and deep tints.

(5) 100 grams of the vat dyestuff obtainable by condensation of hydroxythionaphthene and acenaphthenequinone (molecular weight 314) in a 20% paste form are thoroughly ground with 9,2 grams of zincsulfate ($ZnSO_4+7H_2O$) (molecular weight 287,5) corresponding with ½ mol calculated upon 1 mol of the dyestuff). From this paste the following printing paste is prepared:

108,5 grams of the above dyestuff paste
80 grams of glycerin
350 grams of wheat starch tragacanth thickening
120 grams of potassium carbonate
150 grams of sodium sulfoxylate formaldehyde 1:1 made up with water to 1 kilo The material is printed with this paste, dried and steamed for 3 minutes in a Mather-Platt apparatus. It is then oxidized and further treated in known manner. There are obtained intense scarlet printings which are distinguished by their vivid and clear tints.

(6) 100 grams of 4.4'-dimethyl-6.6'-dichlorothioindigo in a 12% paste form (molecular weight 393)
80 grams of glycerin
350 grams of wheat starch tragacanth thickening
60 grams of sodium carbonate
40 grams of hydrosulfite concentrated powder
260 grams of water are thoroughly mixed and heated to 60° C. until reduction of the dyestuff takes place.

This mixture is cooled, 0,5 gram of ferric chloride—$FeCl_3$—(molecular weight 162) (corresponding with 1/20 mol calculated upon 1 mol of the dyestuff) 80 grams of sodium formaldehyde sulfoxylate are added and well mixed.

The material is printed with this reduced printing color, steamed for 5 minutes in a Mather-Platt apparatus, washed and finished. There are obtained intense pink printings which, in comparison with those prepared without addition of ferric chloride, are distinguished by a more intense tint.

(7) 100 grams of 6.6'-diethoxythioindigo in a 10% paste form (molecular weight 384)
80 grams of glycerin
350 grams of wheat starch tragacanth thickening
60 grams of sodium carbonate
40 grams of hydrosulfite concentrated powder
260 grams of water
1,1 grams of copper vitriol corresponding with 1/6 mol calculated upon 1 mol of the dyestuff) are well mixed and heated to 60° C. until reduction of the dyestuff has taken place. The mixture is then cooled and
80 grams of sodium formaldehyde sulfoxylate are added and well mixed.

The material is printed and treated as indicated in Example 6. The printings thus obtained have a considerably more intense tint than those prepared without addition of copper vitriol.

(8) 10 grams of 6-methoxy-4'.6'-methyl-chlorothioindigo in powder form (molecular weight 374.5)
0.6 gram of $SnCl_2+2H_2O$ (molecular weight 225,7) (corresponding with 1/10 mol calculated upon 1 mol of the dyestuff)
80 grams of glycerin
350 grams of wheat starch tragacanth thickening
60 grams of sodium carbonate
40 grams of hydrosulfite concentrated powder
350 grams of water are well mixed and further treated as in Example 5.

The printings thus obtained likewise have a more intense color than those prepared without addition of zinc sulfate.

In the following claims the term "a salt of a heavy metal" is understood to comprise also oxides and hydroxides of these metals.

We claim:

1. As new compositions of matter, preparations of thioindigoid dyestuffs containing 1/20–½ mol calculated upon the quantity of dry pure dyestuff of a salt of a heavy metal of the group consisting of iron, copper, zinc and tin.

2. As new compositions of matter, preparations of thioindigoid dyestuffs containing 1/20–½ mol calculated upon the quantity of dry pure dyestuff of a salt of a heavy metal of the group consisting of iron, copper, zinc and tin, a reducing agent of the group consisting of sodium hydrosulfite and sodium sulfoxylate formaldehyde, a thickening agent and an agent of alkaline action.

3. As new compositions of matter, preparations of thioindigoid dyestuffs containing 1/20–½ mol calculated upon the quantity of dry pure dyestuff of a salt of a heavy metal of the group consisting of iron, copper, zinc and tin, a reducing agent of the group consisting of sodium hydrosulfite and sodium sulfoxylate formaldehyde, a thickening agent and an alkali metal carbonate.

4. As new compositions of matter, preparations of thioindigoid dyestuffs containing 1/20–½ mol calculated upon the quantity of dry pure dyestuff of an iron salt.

5. As new compositions of matter, preparations of thioindigoid dyestuffs containing 1/20-½ mol calculated upon the quantity of dry pure dyestuff of an iron salt, a reducing agent of the group consisting of sodium hydrosulfite and sodium sulfoxylate formaldehyde, a thickening agent and an alkali metal carbonate.

6. As new compositions of matter, preparations of 4.4'-dimethyl-6.6'-dichlorothioindigo containing only ¼ mol of ferrous sulfate calculated upon the quantity of dry pure dyestuff.

7. As new compositions of matter, preparations of 4.4'-dimethyl-6.6'-dichlorothioindigo containing only ¼ mol of ferrous sulfate calculated upon the quantity of dry pure dyestuff, sodium sulfoxylate formaldehyde, a thickening agent and potassium carbonate.

8. As new compositions of matter, preparations of 6.6'-diethoxythioindigo containing only ½ mol of copper sulfide calculated upon the quantity of dry pure dyestuff.

9. As new compositions of matter, preparations of 6.6'-diethoxythioindigo containing only ½ mol of copper sulfide calculated upon the quantity of dry pure dyestuff, sodium sulfoxylate formaldehyde, a thickening agent and sodium carbonate.

10. As new compositions of matter, preparations of thioindigoid dyestuffs containing a compound of the group consisting of salts, oxides and hydroxides of iron, copper, zinc and tin in a quantity of less than one mol calculated upon the dry pure dyestuff.

11. As new compositions of matter, preparations of thioindigoid dyestuffs containing a compound of the group consisting of salts, oxides and hydroxides of iron, copper, zinc and tin in a quantity of less than one mol calculated upon the dry pure dyestuff, a reducing agent of the group consisting of sodium hydrosulfite and sodium sulfoxylate formaldehyde, a thickening agent and an agent of alkaline action.

ALFRED HAGENBÖCKER.
RUDOLF BRUNE.